(12) United States Patent
Chumchal et al.

(10) Patent No.: US 11,932,314 B2
(45) Date of Patent: Mar. 19, 2024

(54) MODULAR TRUCK BED ASSEMBLY

(71) Applicant: Trailboss Equipment, LLC, Shiner, TX (US)

(72) Inventors: Greg Chumchal, Shiner, TX (US); Jonathan Petru, Victoria, TX (US); Benedict Orsak, Needville, TX (US); Howard Henderson, Moulton, TX (US)

(73) Assignee: Trailboss Equipment, LLC, Shiner, TX (US)

( * ) Notice: Subject to any disclaimer, the term of this patent is extended or adjusted under 35 U.S.C. 154(b) by 776 days.

(21) Appl. No.: 17/062,400

(22) Filed: Oct. 2, 2020

(65) Prior Publication Data

US 2022/0001940 A1 Jan. 6, 2022

Related U.S. Application Data

(60) Provisional application No. 63/048,530, filed on Jul. 6, 2020.

(51) Int. Cl.
*B62D 33/08* (2006.01)
*B62D 33/023* (2006.01)
*B62D 63/02* (2006.01)

(52) U.S. Cl.
CPC ........... *B62D 33/08* (2013.01); *B62D 33/023* (2013.01); *B62D 63/025* (2013.01)

(58) Field of Classification Search
CPC ...... B62D 33/08; B62D 33/023; B62D 33/02; B62D 63/025; B62D 25/2054; B60R 5/041

USPC ........ 296/3, 10, 11, 14, 26.12, 26.14, 26.16, 296/26.06, 26.07, 183.1, 186.4, 186.5, 296/26.03, 193.04, 37, 37.5, 35.3, 43; 414/498

See application file for complete search history.

(56) References Cited

U.S. PATENT DOCUMENTS

| | | | | |
|---|---|---|---|---|
| 6,089,639 | A * | 7/2000 | Wojnowski | B62D 33/02 296/37.6 |
| 6,776,431 | B1 * | 8/2004 | Dick | B62D 53/0828 280/425.2 |
| 7,201,453 | B2 * | 4/2007 | Vandewinckel | B62D 33/02 296/10 |
| 9,272,740 | B1 * | 3/2016 | Portenier | B62D 33/02 |
| 9,713,978 | B2 * | 7/2017 | Petru | B60P 7/135 |
| 2020/0324832 | A1 * | 10/2020 | Higgins | B62D 33/02 |

* cited by examiner

*Primary Examiner* — Stephen T Gordon
(74) *Attorney, Agent, or Firm* — Jackson Walker L.L.P.

(57) ABSTRACT

A disclosed modular truck bed assembly includes two or more modular truck bed components configured to form a modular truck bed suitable for use with a bedless truck. The modular truck components may include two or more modular components that combine to form a multi-piece bed panel. The modular components that combine to form the multi-piece bed panel may include a center bed module attached between left and right wing bed modules. The center bed panel may be affixed to structural elements of the bedless while the wing bed modules may be attached to the center module. The center bed module may include a center bed panel, with or without a gooseneck hitch, and a center trail panel, without or without a trailer hitch. The assembly may include a vertically adjustable bulkhead positioned forward of the center bed panel and either side of the assembly may include a skirt.

29 Claims, 4 Drawing Sheets

MODULAR TRUCK BED ASSEMBLY

This application claims the benefit of and priority to U.S. application No. 63/048,530, filed Jul. 6, 2020, which is incorporated by reference herein.

BACKGROUND

In the United States and elsewhere, sales of pickup trucks, bed delete trucks, and cab and chassis trucks, collectively referred to herein as "bedless trucks," comprise a commercially significant share of motorized vehicles sales. Historically, pickups trucks have been distributed to dealers and marketed to commercial and consumer buyers with a single-piece bed pre-affixed to a rearward portion of the truck's structural frame. Similarly, aftermarket beds for bed delete trucks, cab and chassis trucks, and pickups are generally single-piece truck beds that are highly specific to a particular configuration and difficult and expensive to transport, distribute, and stock. Subject matter disclosed herein includes a modular truck bed assembly suitable for bedless trucks.

Defined terms. Unless specifically indicated otherwise, defined terms, identified in quotation marks below, are intended to be interpreted, for purposes of the present disclosure, in accordance with the listed definitions.

"truck"—a motor vehicle having one or more dedicated cargo spaces designed to transport substantial non-passenger cargo.

"pickup" or "pickup truck"—A light or medium duty truck that includes an enclosed cab in front of an open cargo area generally referred to as a bed or box.

"bed delete" or "bed delete truck"—A truck with substantially all of the features and characteristics of a pickup, except that a bed delete is distributed and sold without a bed. Also referred to as a "box delete" or "box delete truck."

"cab and chassis" or "cab and chassis truck"—A vehicle, typically including a chassis, drivetrain, and an enclosed cab, configured for customized aftermarket assembly of, among other things, a bed and bulkhead, and specialized for specific capabilities and service functions. A cab and chassis truck is generally delivered to a vehicle upfitter for customization.

"bedless truck"—Generally, any truck configured to receive a modular truck bed or any truck that can be readily modified to receive a modular truck bed. For purposes of this disclosure, pickup trucks, bed delete trucks, and cab and chassis trucks are all bedless trucks unless specifically indicated otherwise.

"modular component" or "module"—a component configured for use in combination with one or more other modular components that, when properly combined, provide a specific structure or function.

"bulkhead" or "headache rack"—a component that provides a barrier between a truck bed and a rear of the truck's cab.

SUMMARY OF THE INVENTION

One aspect of the subject matter set forth below discloses a modular truck bed assembly comprising two or more modular truck bed components configured to form a modular truck bed suitable for use as a truck bed for a bedless truck, i.e., a pickup truck, a bed delete truck, or a cab and chassis truck. The modular truck bed components may include modular components that combine to form a multi-piece bed panel of the modular truck bed. The multi-piece bed panel may include a center bed module configured to attach to a left wing bed module and a right wing bed module. A left edge of the center bed module may abut a right edge of the left wing bed module and a right edge of the center bed module may abut a left edge of the right wing module. In at least one embodiment, the center bed module is affixed to one or more structural elements of the bedless truck and the wing bed modules are attached to the center bed module, but not affixed to structural elements of the bedless truck.

The center bed module may have an L-shaped cross section corresponding to a center bed panel and a center tail panel of the center bed module. The center bed panel may be a substantially planar and continuous panel and may provide a center portion of the multi-piece bed panel and the center tail panel may extended downward, substantially perpendicularly, from a rear edge of the center bed panel. The center bed panel may include or omit a gooseneck recess suitable for a gooseneck hitch while the center tail panel may include or omit a trailer hitch. The center tail panel may include a window or opening to expose and illuminate a rear license plate of the bedless truck.

The modular truck bed assembly may include a bulkhead module configured to attach to one or more modules of the multi-piece bed panel. The bulkhead module may be substantially perpendicular to the multi-piece bed panel and may be positioned proximal to a forward edge of the multi-piece bed panel in proximity to a rear wall of an enclosed cab of the bedless truck. In at least some embodiments, the bulkhead module is vertically adjustable and may be attached to the center bed module and to both wing bed modules. The modular truck bed assembly may include a side skirt, with or without storage compartments, attached to an outer edge of either or both wing bed modules. The wing bed modules may include dual wide modules to accommodate dual wheel bedless trucks and single wide modules to accommodate single wheel bedless trucks.

The multi-piece bed panel may include a spacer, positioned adjacent to a forward edge of the center bed module to displace the forward edge of the center bed module relative to a cab of the bedless truck. In these embodiments, the spacer may permit the use of a standardized center bed module for different cab to axle configurations. For example, for center bed modules that include a gooseneck feature, the displacement of the center bed module, from the rear of the cab, attributable to the spacer may be sufficient to align the gooseneck feature with a rear axle of the bedless truck. The modular truck bed assembly may still further include an extension attached to a rearward edge of the center bed module, wherein the extension extends a length of the bed panel by an amount determined in accordance with the displacement attributable to the spacer, wherein the total length of the bed panel, including the spacer, the center bed module, and the extension, remains the same for spacers of different dimensions.

Another aspect of the subject matter set forth below discloses a motorized vehicle that includes a bedless truck and a modular truck bed comprising two or more modular truck bed components. The modular truck bed components may combine to form a multi-piece bed panel of the modular truck bed for the bedless truck. The multi-piece bed panel may include a center bed module configured to attach to two wing bed modules, wherein a left edge of the center bed module abuts a right edge of a left wing bed module and a right edge of the center bed module abuts a left edge of the right wing module. The center bed module may have an L-shaped cross section and may include a center bed panel and a center tail panel that is substantially perpendicular to the center bed panel, wherein the center bed panel provides a center portion of the multi-piece bed panel. The center bed module may be affixed to one or more structural or chassis elements of the bedless truck and the wing bed modules may be attached to the center bed module, without being affixed directly to structural or chassis elements of the bedless truck. Side skirts may be attached to an outer edge of either or both of the wing bed modules. A bulkhead module may be attached at or near a forward edge of the multi-piece bed panel in proximity to a rear wall of the bedless truck's cab. The bed panel may include a spacer at or near a forward edge of the center bed panel to displace the center bed module relative to a cab of the bedless truck. The spacer may be suitable to accommodate a standard size center bed module within different cab-to-axle configurations of the bedless truck.

BRIEF DESCRIPTION OF THE DRAWINGS

The invention is disclosed via a detailed description of the following drawings, in which.

The drawings are exemplary and illustrative of selected features and embodiments of the invention rather than exhaustive.

DETAILED DESCRIPTION

Figure 1:
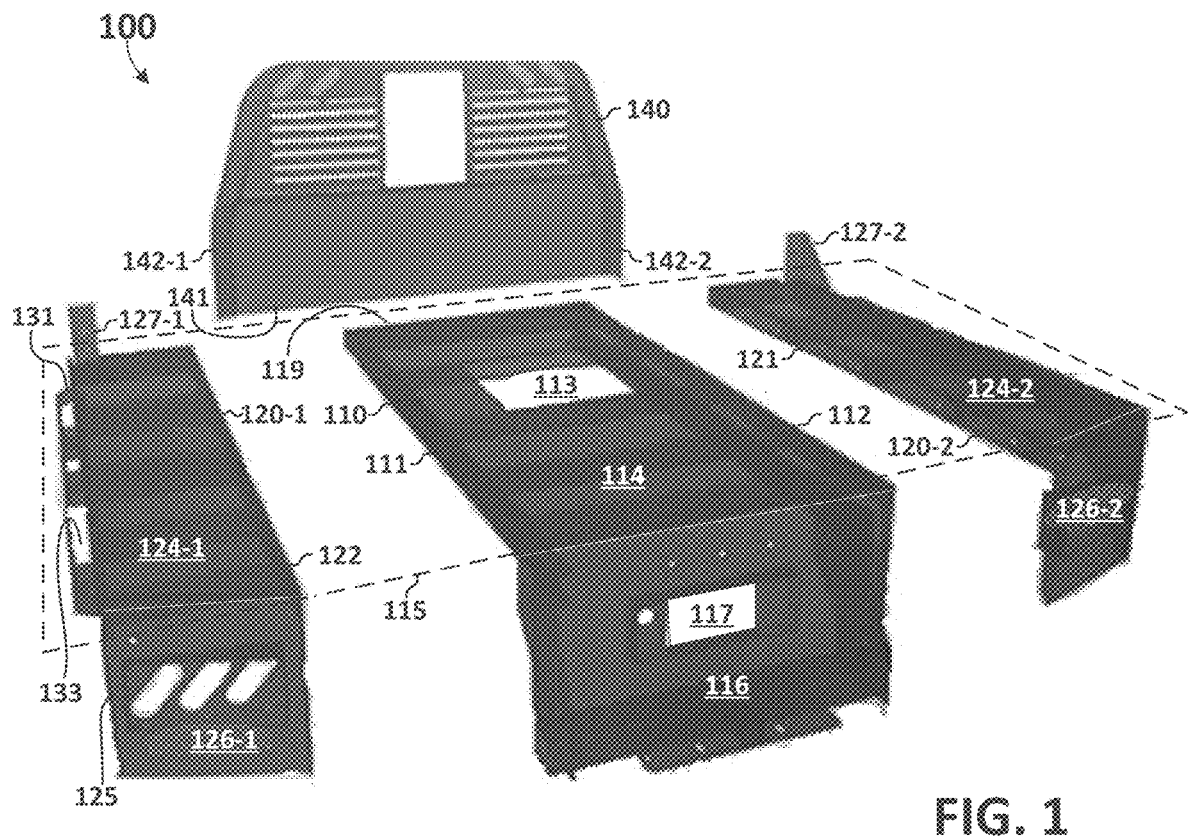
FIG. 1 illustrates an exploded view of a modular truck bed assembly.
Figure 2:
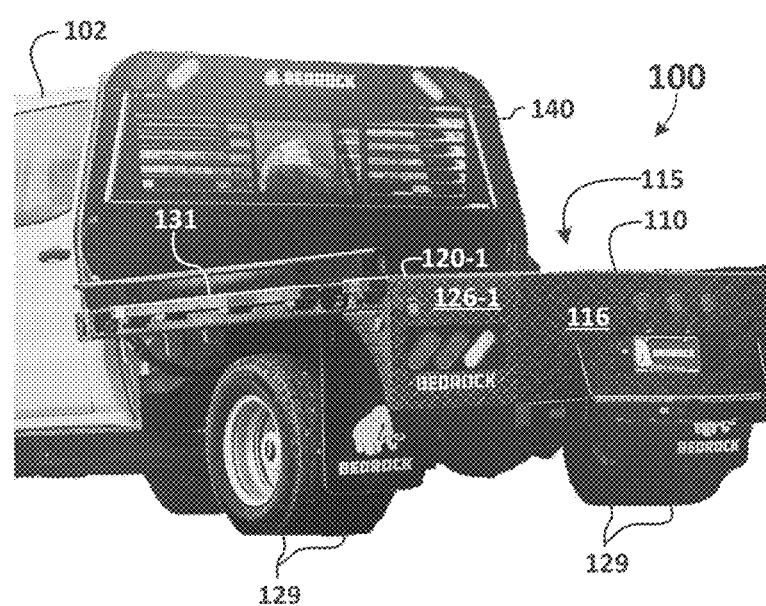
FIG. 2 illustrates a perspective view of a modular truck bed assembly installed on a bedless truck.

Referring to the drawings, FIG. 1 is an exploded view of a modular truck bed assembly 100 comprising two or more modular truck bed components. The modular components support multiple truck bed configurations and are easier and less costly to transport, distribute, and store than conventional monolithic truck beds. The modular truck bed assembly 100 illustrated in FIG. 1 includes a center bed module 110, two wing bed modules 120, including a left wing bed module 120-1 and a right wing bed module 120-2, and a bulkhead module 140. The modular truck bed components, when properly installed, form a multi-component bed panel 115 suitable for use with a bedless truck 102, an example of which is depicted in FIG. 2. Although the illustrated modular truck bed assembly 100 includes four modular components, other embodiments of modular truck bed assembly 100 may include a different number of modules. As a non-limiting example, a three-module embodiment of modular truck bed assembly 100 may include center bed module 110 and two wing bed modules 120, but may omit bulkhead module 140. As another example, although the multi-component bed panel 115 illustrated in FIG. 1 includes three modular components, other embodiments may include two modular components while still other embodiments may include four or more modular components. Similarly, although each of the modules is illustrated with a particular shape and size or form factor, any one or more of the modules may be implemented with a size, shape, or form factor that is different than those shown in FIG. 1 and FIG. 2.

When properly installed on a bedless truck, the center bed panel 114 of center bed module 110 and the wing bed panels 124 of the two wing bed modules 120 form a planar or substantially planar and a visually continuous or substantially continuous multi-component bed panel 115. As illustrated in FIG. 1 and FIG. 2, center bed module 110 is configured to be positioned between left wing bed module 120-1 and right wing bed module 120-2, with a left edge 111 of center bed module 110 abutting a right edge 122 of left wing bed module 120-1 while a right edge 112 of center bed module 110 abuts a left edge 121 of right wing bed module 120-2.

In at least some embodiments, center bed module 110 is common to all configurations of the modular truck bed assemblies 100 for any particular make/model/year of bedless truck 102. Center bed module 110 may accommodate two or more different configurations of wing bed modules 120. As an example, center bed module 110 may be used with different widths of wing bed modules 120 and, regardless of the width, any wing bed module 120 may be implemented with or without side skirts (illustrated and described below). This compatibility and interchangeability may beneficially enable a distributor or upfitter to carry less inventory of certain modules relative to other modules.

The center bed module 110 illustrated in FIG. 1 includes an optional gooseneck feature 113 suitable for accommodating a gooseneck hitch, which is not explicitly depicted in FIG. 1. In some embodiments, gooseneck feature 113 includes a gooseneck hitch that is welded or otherwise permanently affixed to center bed module 110. In other embodiments, gooseneck feature 113 is a recess, opening, or hole formed in center bed module 110 to accommodate an existing gooseneck hitch attached to structural elements of the bedless truck or to accommodate an aftermarket gooseneck hitch that may be attached to either the center bed module or the bedless truck. In embodiments of center bed module 110 that do not include optional gooseneck feature 113, center bed panel 114 of center bed module 110 is a substantially continuous sheet, such as the center bed panel 114 illustrated in FIG. 3 below.

The center bed module 110 illustrated in FIG. 1 features an L-shaped cross section that includes a center bed panel 114 and a center tail panel 116. The center bed panel 114 and center tail panel 116 of FIG. 1 intersect at a line defined by a rear edge of center bed panel 114 and an upper edge of center tail panel 116. The center bed panel 114 illustrated in FIG. 1 is configured to lie in a plane that is perpendicular or substantially perpendicular to the force of gravity while the center tail panel 116 is configured to lie in a plane that is generally parallel to the force of gravity. The wing bed modules 120 illustrated in FIG. 1 also have an L-shaped cross section that includes a horizontally-oriented wing bed panel 124 and a vertically oriented wing tail panel 126, including tail light elements 125. When the center bed module 110 is properly installed between wing bed modules 120 with center bed panel 114 forming a substantially planar surface with wing bed panels 124-1 and 124-2, the center tail panel 116 of center module 110 may be in contact with or in close proximity to wing tail panels 126-1 and 126-2 of the wing bed panels 120-1 and 120-2.

The center tail panel 116 illustrated in FIG. 1 includes a rear plate window 117 sized and positioned within center tail panel 116 to expose and illuminate a license plate (not depicted) of the bedless truck. The center tail panel 116 shown in FIG. 1 further includes a trailer hitch receiver 118 (more clearly illustrated in FIG. 3 below) configured and positioned to accept a suitable trailer hitch. In other embodiments, including embodiments suitable for use with the bedless truck that is distributed by the manufacturer with a trailer hitch receiver already welded to or otherwise affixed to the truck, center tail panel 116 may include or define an opening positioned and sized to accept the trailer hitch receiver of the bedless truck. Although center tail panel 116 is illustrated and described as an integral part of center bed module 110, other embodiments of center bed module 110 may omit a center tail panel 116, in which case, a center tail panel suitable for exposing and illuminating a rear license plate of the bedless truck may be provided and configured to attach to center bed module 110.

FIG. 2 illustrates a dual wheel embodiment of the left wing bed module 120-1. In dual wheel embodiments, the width of wing bed modules 120 is sufficient to accommodate a dual rear wheel truck featuring a pair of rear dual wheels 129. Other embodiments of wing bed modules 120 include single wheel embodiments having a width suitable for a truck with a pair of single rear wheels (not depicted in FIG. 2). It is noted that the dual wheel and single wheel embodiments of wing bed modules 120 are both compatible with center bed module 110 such that either embodiment of wing bed module 120 may be attached to center bed module 110.

Figure 7:
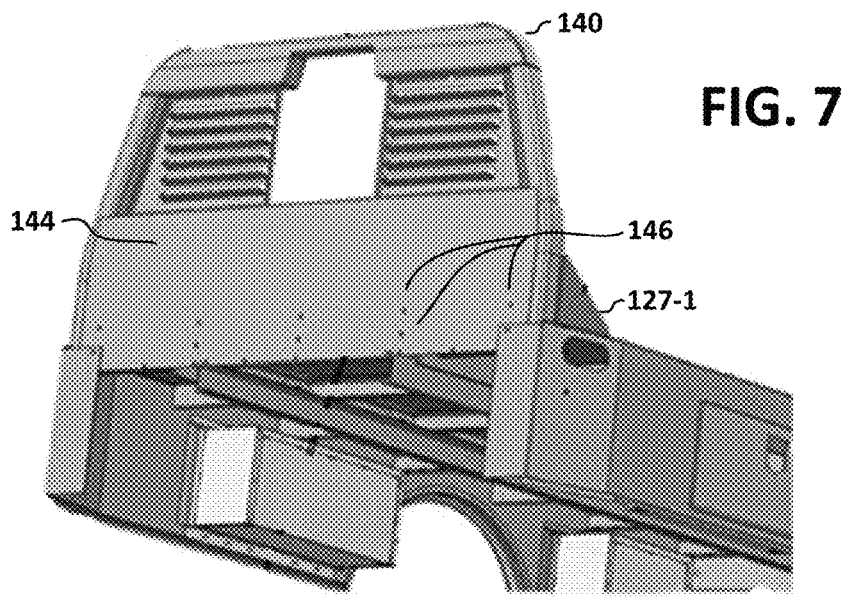
FIG. 7 is a perspective view of a modular truck bed assembly that includes a bulkhead module.

The modular truck bed assembly 100 illustrated in FIG. 1 includes a bulkhead module 140 configured to attach to center bed module 110 with a lower edge 141 of bulkhead module 140 positioned in proximity to a forward edge 119 of center bed module 110. A left pole 142-1 of bulkhead module 140 may be attached to a left bolt-on gusset 127-1 of left wing bed module 120-1 while a right pole 142-2 may be affixed to a right bolt-on gusset 127-2 of right wing bed module 120-2. The bulkhead module 140 illustrated in FIG. 1 may include one or more features in accordance with features disclosed for a vertically adjustable and removable headache rack as disclosed in U.S. Pat. No. 10,046,691, issued Aug. 14, 2018, and U.S. Pat. No. 9,713,978, issued Jul. 25, 2017, both of which are incorporated by reference herein in their respective entireties. Turning momentarily to FIG. 7, bulkhead module 140 is depicted apart from the enclosed cab of the applicable bedless truck to illustrate an embodiment in which bulkhead module 140 includes a vertical back plate 144 featuring pre-fabricated holes 146 positioned, with regular or varying spacing, across the width of vertical back plate 144 so that bulkhead module 140 may be affixed not just to the center bed module 110, but also to the left and right wing modules 120 for additional rigidity and stability. Also shown in FIG. 1 and FIG. 2 are optional rub rails 131 attached to an outer edge of left wing bed module 120-1. Rub rails 131 protect the wing bed panels 120 from damage. The rub rails illustrated in FIG. 1 and FIG. 2 include stake pockets 133 for receiving stakes and providing other features that can be used to secure cargo with straps, rope, chain, or the like. Other embodiments of modular truck bed assembly 100 may include rub rails without stake pockets or no rub rails.

Figure 3:
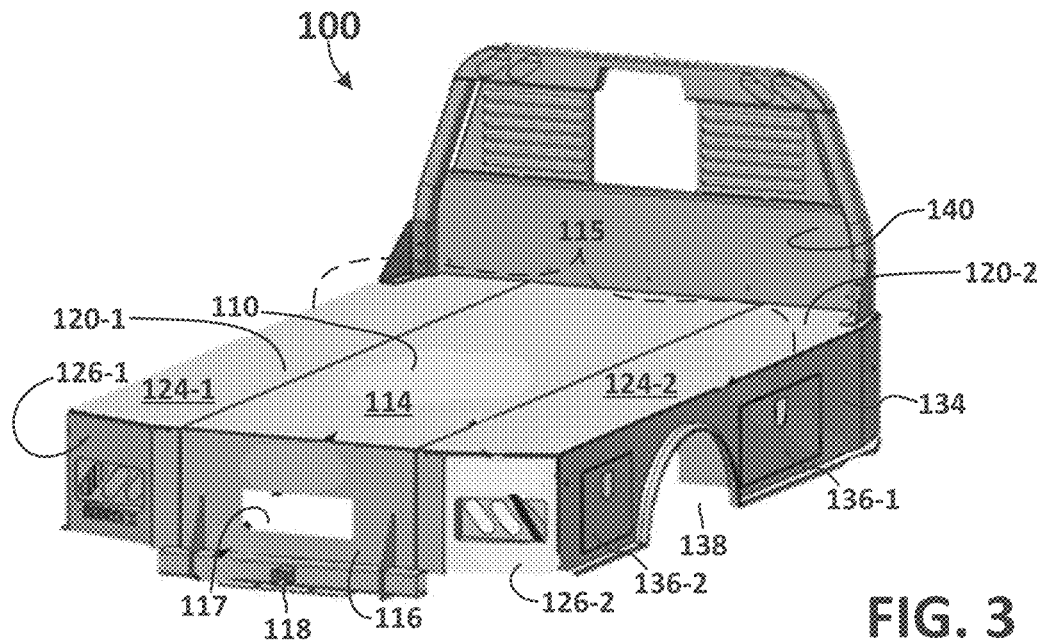
FIG. 3 is a perspective view of the modular truck bed assembly from above and behind.
Figure 4:
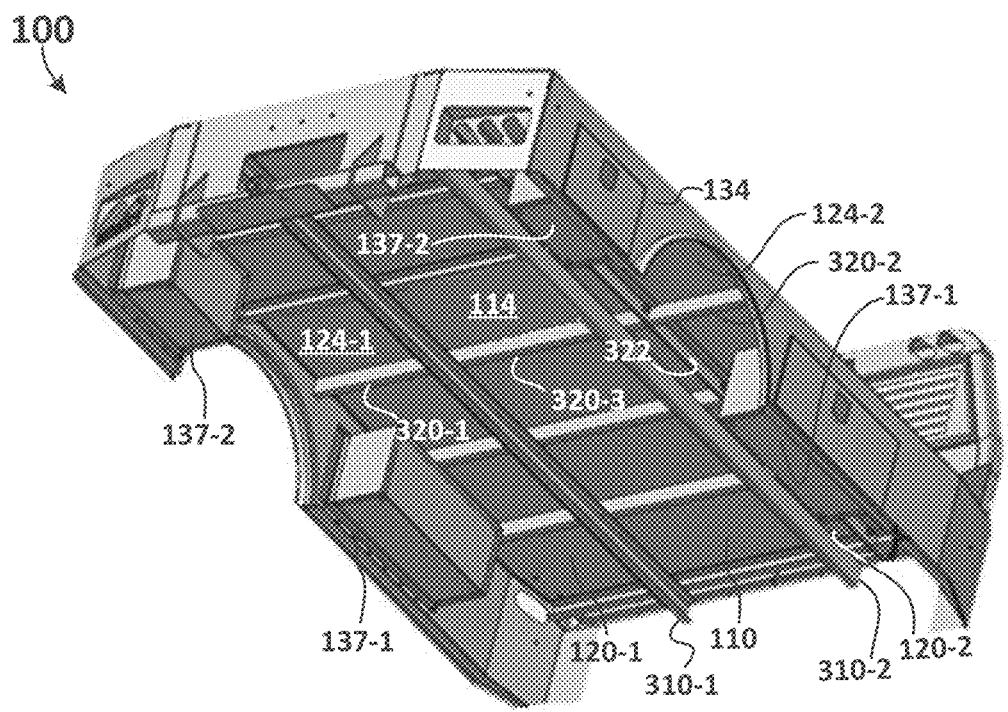
FIG. 4 is a perspective view of the modular truck bed assembly from below.

FIG. 3 and FIG. 4 illustrate two perspective views of modular truck bed assembly 100 in an assembled configuration. Although modular truck bed assembly 100, when assembled as shown in FIG. 3 and FIG. 4, would typically be installed on or affixed to the bedless truck, the bedless truck is omitted from FIG. 3 and FIG. 4 for the sake of clarity. Like the modular truck bed assembly 100 illustrated in FIGS. 1 and 2, the modular truck bed assembly 100 illustrated in FIG. 3 includes a vertically-oriented bulkhead module 140 and three horizontally-oriented bed modules, including center bed module 110, left wing bed module 120-1, and right wing bed module 120-2, which combine to define or form the substantially planar, continuous, and rigid multi-component bed panel 115. The center tail panel 116 shown in FIG. 3 includes a trailer hitch receiver 118 configured and positioned to accept a suitable trailer hitch. In other embodiments, including embodiments suitable for use with the bedless truck that is distributed by the manufacturer with a trailer hitch receiver already welded to or otherwise affixed to the truck, center tail panel 116 may include or define an opening positioned and sized to accept the trailer hitch receiver of the bedless truck.

The wing bed modules 120 illustrated in FIG. 3 include wing bed panels 124 that form wing portions of the multi-component bed panel 115. The right wing bed module 120-2 illustrated in FIG. 3 includes an optional, vertically oriented panel, referred to herein as optional side skirt 134 or, more simply, side skirt 134. The side skirt 134 shown in FIG. 3 is a substantially planar panel extending downward from a peripheral edge of second wing bed panel 124-2. Other embodiments of optional side skirt 134, not depicted in FIG. 3, may include portions that are non-planar or contoured for aesthetic or functional purposes. The optional side skirt 134 shown in FIG. 3 is substantially perpendicular to right wing bed panel 124-2 and includes or defines a hemispherical wheel well opening 138 configured and positioned to accommodate the bedless truck's right rear wheel or wheels (not depicted).

The side skirt 134 shown in FIG. 3 further includes openings accommodating two storage doors 136, including a first storage door 136-1 and a second storage drawer 136-2, each of which provides access to a corresponding tool box or storage compartment, 137-1 and 137-2, illustrated in FIG. 4. In those embodiments of side skirt 134 that include one or more tool boxes, each tool box 137 may be welded or otherwise securely attached to the side skirt 134. Although the optional side skirt 134 shown in FIG. 3 and FIG. 4 includes two storage compartments, other embodiments of side skirt 134 may have one storage compartment 137 or no storage compartments while still other embodiments of side skirt 134 may include three or more storage compartments. Although typically provided as a separate component that is attached to wing bed panel 124 with one or more suitable fasteners (not depicted) such as nuts and bolts, rivets, or the like, side skirt 134 may comprise a portion of a single, monolithic wing bed module 120 panel that is creased to define the peripheral edge of wing bed panel 124. As seen in FIG. 4, both wing bed modules 120 of the illustrated modular truck bed assembly 100 include a side skirt 134 and both of the side skirts 134 include two storage compartments 137. In other embodiments, one wing bed module 120, e.g., right wing bed module 120-2 may include a side skirt 134 while the other wing bed module, e.g., left wing bed module 120-1, may omit a side skirt or may include a side skirt with no storage compartments or a different number of storage compartments than the side skirt on right wing bed module 120-2.

In some embodiments of modular truck bed assembly 100, one of the modular components, referred to herein as the anchor module, is affixed to the chassis or other structural elements of bedless truck 102 while the remaining modules of modular truck bed assembly 100 are attached to the anchor module without being directly affixed to the chassis of bedless truck 102. In these embodiments, the anchor module may include one set of features or elements for affixing the anchor module to the chassis of bedless truck 102 and another set of features or elements for attaching the other modules of modular truck bed assembly 100 to the anchor module. In at least one embodiment of modular truck bed assembly 100 that employs an anchor module design, center bed module 110 is the anchor module, such that center bed module 110 is affixed to one or more structural elements of the truck chassis while other components of modular truck bed assembly 100 are attached to center bed module 110.

FIG. 4 illustrates an underside of modular truck bed assembly 100. As shown in FIG. 4, modular truck bed assembly 100 includes frame mounts 310-1 and 310-2 for attaching one or more of the truck bed modules to one or more structural support elements (not depicted) of the bedless truck (not depicted). The frame mounts 310 illustrated in FIG. 4 are elongated C-channel members, but frame mounts 310 may be implemented with other types of members including I-beams, or beams, brackets, or braces with a different cross sectional configuration. The frame mounts 310 illustrated in FIG. 4 are both attached to center bed module 110, which serves as the anchor module for the illustrated embodiment of modular truck bed assembly 100. Other embodiments of modular truck bed assembly 100 may include frame mounts attached to two or more of the truck bed modules or frame mounts attached to a truck bed module other than center bed module 110. Frame mounts 310 may be directly and securely attached to one or more structural elements of the bedless truck to stabilize and securely anchor center bed module 110 to the truck chassis.

FIG. 4 illustrates lateral support members, referred to herein as crossbar segments 320, that traverse and support the underside of the modular bed panels above. The crossbar segments 320 illustrated in FIG. 4 include a first crossbar segment 320-1 underlying left wing bed panel 124-1, a second crossbar segment 320-2 underlying right wing bed panel 124-2, and a third crossbar segment 320-3 underlying center bed panel 114. FIG. 4 further depicts an elongated flange 322 extending along the underside of right wing bed panel 124 of right wing bed module 120-2. Elongated flange 322 is the only one of four elongated flanges that is visible in the perspective view of FIG. 4. Elongated flanges 322 facilitate attachment between center bed module 110 and each adjacent wing bed module 120. Each crossbar segment 320 and each flange 322 may be welded or otherwise permanently affixed to its corresponding bed panel.

Each wing bed module 120 may include a flange 322 underlying wing bed panel 124 and positioned along wing bed module's center edge, i.e., the edge in contact with a corresponding edge of center bed module 110. Similarly, center bed module 110 may have two flanges underlying center bed panel 114, one flange positioned along the left edge 111 (see FIG. 1) of center bed module 110 and one flange positioned along the right edge 112 (see FIG. 1). The interior end of each crossbar segment 320 on each wing bed module 120 terminates at the wing bed module's flange 322 while each end of each crossbar segment 320 on center bed module 110 terminates at a respective flange 320 of center bed module 110. In at least some embodiments, the ends of each crossbar segment 320 may be welded or otherwise securely attached to the corresponding flange 322. When the center bed module 110 and the wing bed modules 120 are properly installed, the flange on each wing bed module is positioned in contact with or in close proximity to a corresponding flange of center bed module 110. Each flange may include prefabricated holes, located along the length of the flange, suitable for attaching each pair of closely space flanges with nuts and bolts or the like to secure center bed mode 110 to each wing bed module 120. In an alternative embodiment, rather than terminating each crossbar segment at its applicable flange, the flanges described above may be omitted or modified to include gaps or openings, the lengths of at least some of the crossbar segments may be adjusted, and the ends of adjacent crossbar segments may be configured such that the end of each extended crossbar segment can be inserted into an opposing end of a crossbar segment on an adjacent module. As a non-limiting example, the inward ends of the crossbar segments on the wing bed modules, i.e., the ends that are closer to the center bed module, may be extended beyond the edge of the wing bed module and tapered to reduce the crossbar segment's outer diameter or perimeter. Each of these tapered and extended ends could be inserted into an open end of a corresponding crossbar segment on the center bed module. In at least some such embodiments, the extended portions of the wing crossbar segments may be bolted or otherwise attached to the receiving portions of the center crossbar segments via prefabricated holes formed in the overlapping portions of each crossbar segment.

The crossbar segments 320 illustrated in FIG. 4 are arranged to be in alignment when center bed 110 and wing bed modules 120-1 and 120-2 are properly installed. In other embodiments (not depicted), crossbar segments 320 of center bed module 110 may be intentionally misaligned, i.e., displaced, in a direction parallel to the orientation of frame mounts 310, relative to the corresponding crossbar segments 320 on wing bed modules 120. In such embodiments, the crossbar segments on center bed module 110, or the crossbar segments on each wing bed module 120, or both, may extend beyond the edge of the adjacent bed module, either through openings or gaps in flanges 322 or by omitting flanges 322, and thereby overlap a corresponding crossbar segment on the adjacent bed module. The overlapping portions of the crossbar segments may include prefabricated holes to facilitate attachment between the overlapping portions of crossbar segments with nuts and bolts or another suitable fastener.

Figure 5:
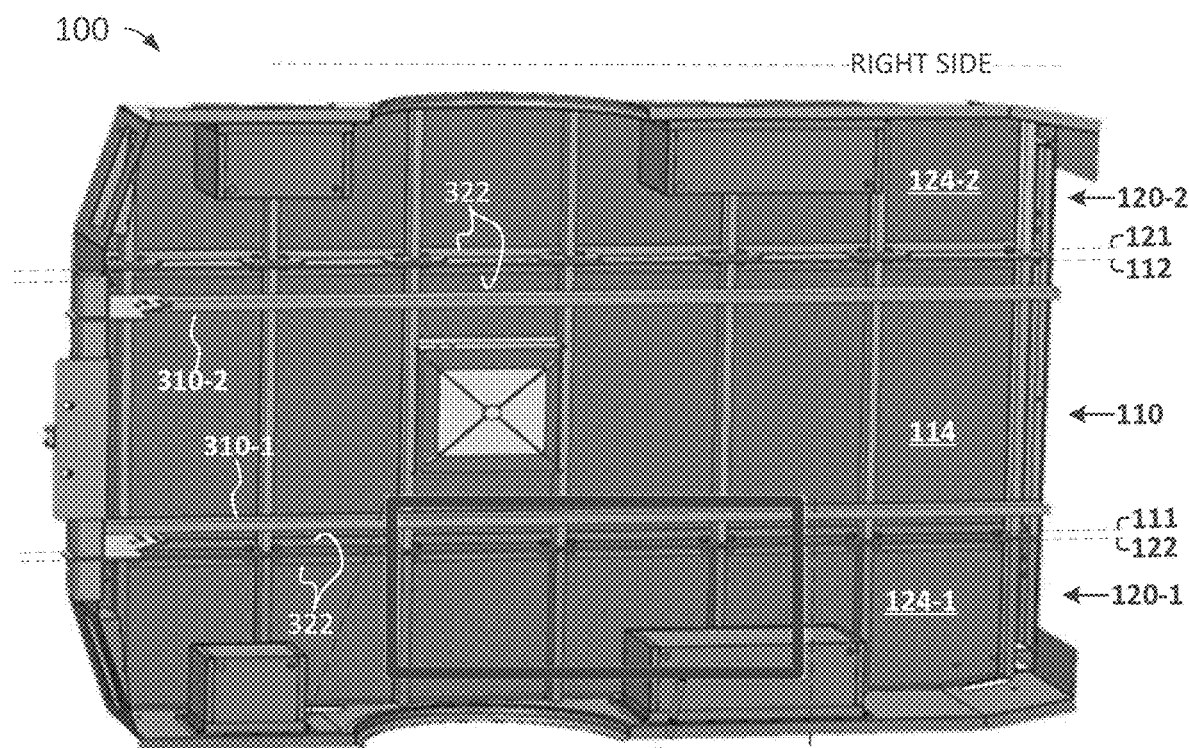
FIG. 5 illustrates an underside of the modular truck bed assembly.
Figure 6:
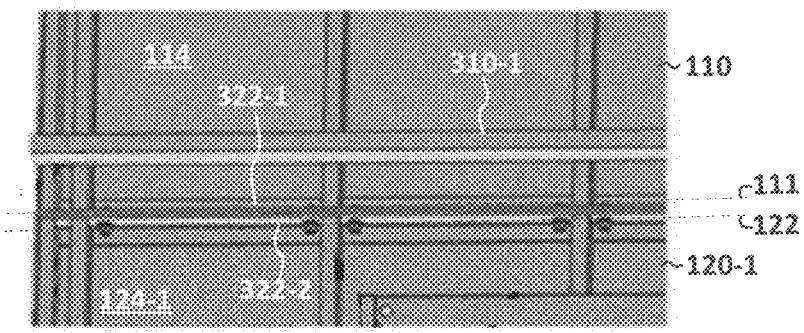
FIG. 6 illustrates details of an interface between a center panel and a wing bed panel of the modular truck bed assembly from below.

FIG. 5 illustrates an exemplary interface between wing bed modules 120 and center bed module 110 and FIG. 6 is a magnified view of a portion of FIG. 5. As discussed above, some embodiments include a pair of elongated flanges 322, located under the bed panel, extending along the lateral edges of center bed module 110, each of which is attached to a corresponding elongated flange 322 extending along the underside of an interior edge of the adjacent wing bed modules 120. FIG. 6 is a magnified view of a portion of FIG. 5, illustrating an exemplary interface between center bed module 110 and left wing module 120-1. The interface illustrated in FIG. 6 includes a first elongated flange 322-1 underlying center bed panel 114 of center module 110 and a second elongated flange 322-2 underlying wing module panel 124-1. The illustrated first elongated flange 322-1 extends along the underside of the center bed module's left edge 111 while the second elongated flange 322-2 extends along the underside of the wing bed module's right edge 122. When, as FIG. 6 illustrates, center module 110 is positioned with its left edge 111 in contact with or in close proximity to right edge 122 of left wing bed module 120-1, first elongated flange 322-1 will be in contact with or in close proximity to second elongated flange 322-2 and the pair of elongated flanges 322 may be bolted together through openings (not visible in FIG. 5 or FIG. 6) in each flange. Another pair of elongated flanges (not depicted in FIG. 6) enables an analogous attachment between center bed module 110 and right wing bed module 120-2.

Figure 8:
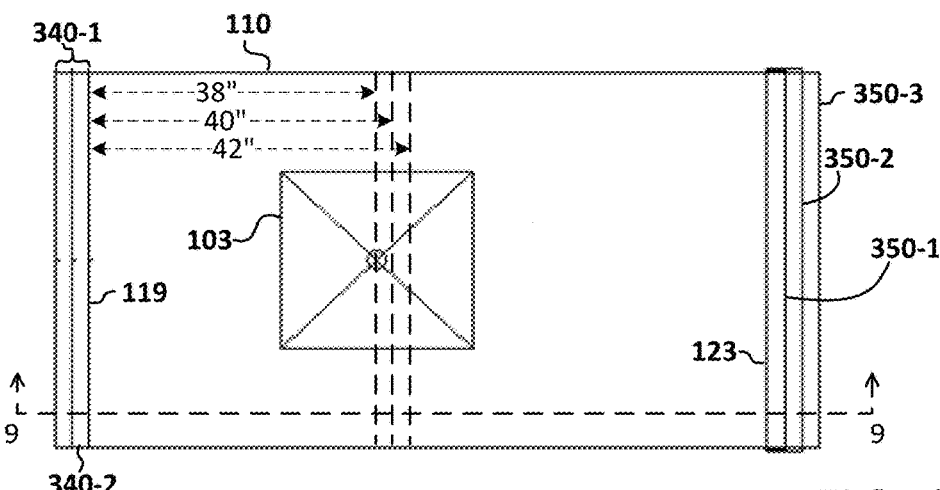
FIG. 8 illustrates a plan view of a standard size center bed panel with spacers and extensions to accommodate variations in a cab to axle dimension of the bedless truck.
Figure 9:
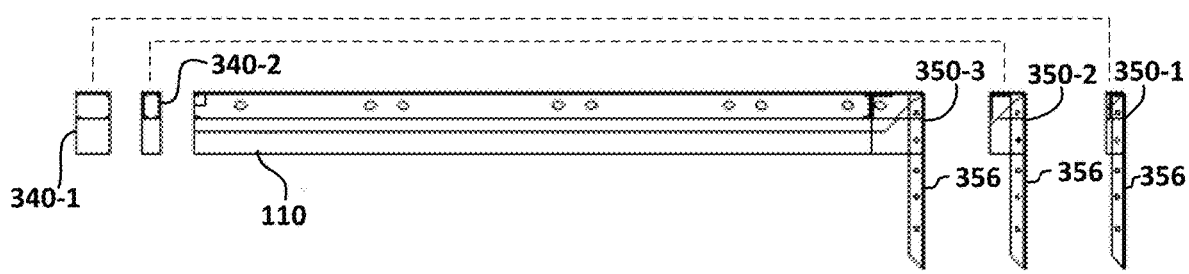
FIG. 9 is a side elevation view of the center bed panel of FIG. 8.

FIG. 8 illustrates a top view of a center bed module 110 configured for use with center module spacer and extension components that produce compatibility between a single, center bed module 110 and two or more bedless truck configurations including configurations with two or more cab-to-axle displacements. FIG. 9 is a cross sectional taken along the dotted line 9-9 illustrated in FIG. 8. The center bed module 110 illustrated in FIG. 8 includes a gooseneck hitch 103. Gooseneck hitches function best when located directly over the rear axle or very slightly forward (e.g., 1" or less) of the rear axle. Often, however, a single make/model/year of a particular bedless truck may be manufactured and distributed with any of two or more cab-to-axle displacements. An example is a make/model/year of a bedless truck offered with cab-to-axle displacements of 38", 40", and 42". A modular truck bed assembly that includes either a gooseneck hitch, such as the gooseneck hitch 103 illustrated in in FIG. 8, or a gooseneck hitch opening for use with an existing or an externally provided gooseneck hitch, must ensure the proper positioning of the gooseneck hitch.

FIG. 8 and FIG. 9 illustrate two center module spacers 340-1 and 340-2 and three center module extensions 350-1, 350-2, and 350-3 suitable for use in conjunction with the one center bed module 110 to accommodate the three previously referenced bed to axle displacements, i.e., 38", 40" and 42". In this example, center module spacer 340-1 is a 4-inch spacer, center module spacer 340-2 is a 2-inch spacer, center module extension 350-1 is a 2-inch extension, center module extension 350-2 is a 4-inch extension and center module extension 350-3 is a 6-inch extension. The displacement between the center of gooseneck hitch and a forward edge 119 of center bed module is shown as 38". In an actual implementation, the 38" figure would be adjusted to account for displacement between the rear of the bedless truck cabin and the forward edge 119 of center bed module 110, but that offset is omitted from FIG. 8 and FIG. 9 for the sake of clarity.

To accommodate a bedless truck with a 38" cab-to-axle displacement, no center module spacer 340 is required because center bed module 110 has an edge-to-hitch displacement of 38". To accommodate a bedless truck with a 40" cab-to-axle displacement, the 2-inch center module spacer 340-1 is installed at the forward edge 119 of center bed module 110 to shift the center bed module 110 two inches to the right of where the module is illustrated in FIG. 8. Similarly, to accommodate a bedless truck with a 42" cab-to-axle displacement, the 4-inch center module spacer 340-1 is installed at the forward edge 119 of center bed module 110 to shift the center bed module 110 four inches to the right of where the module is illustrated in FIG. 8. Although the embodiment just described uses a 4-inch spacer to accommodate a 42" cab-to-axle configuration, other embodiments may connected two 2-inch center module spacers 340-2.

To maintain a single truck bed length across all cab-to-axle configurations, center module extensions 350 having different widths are attached to the rear edge 123 of modular truck bed assembly 110. For a 38" cab-to-axle configuration, which does not use a center module spacer 340, the 6-inch center module extension 350-3 is attached to rear edge 123 of center bed module 110. For a 40" cab-to-axle configuration, which uses the 2-inch center module spacer 340-2, the 4-inch center module extension 350-2 is attached to rear edge 123 of center bed module 110. Likewise, for a 42" cab-to-axle configuration, which uses the 4-inch center module spacer 340-1, the 2-inch center module extension 350-1 is attached to rear edge 123 of center bed module 110. Each of the three center module extensions 350 illustrated in FIG. 9 includes a vertically oriented panel 356 that serves as the center tail panel 116 illustrated in FIG. 1.

The preceding description of modular truck assembly 100 describes exemplary embodiments to aid in the interpretation of the appended claims and it will be appreciated that other embodiments of modular truck bed components that support multiple truck bed configurations and facilitate transportation, distribution, and storage of truck bed components are within the scope of the appended claims. The disclosed modular truck bed assembly can interchangeably accommodate truck bed configurations that include or omit side skirts, configurations with side skirts that include or omit one or more storage compartments, configurations that accommodate dual wheel or single wheel trucks, and configurations that include or omit a trailer hitch receiver, include or omit a gooseneck hitch recess, and include or omit a corresponding gooseneck hitch.

What is claimed is:

1. A modular truck bed assembly, comprising two or more modular truck bed components configured to form a modular truck bed suitable for use as a truck bed for a bedless truck, wherein:
    the two or more modular truck components include two or more modular components that combine to form a multi-piece bed panel of the modular truck bed;
    the two or more modular components that combine to form the multi-piece bed panel include a center bed module configured to attach to two wing bed modules, including a left wing bed module and a right wing bed module;
    a left edge of the center bed module abuts a right edge of the left wing bed module and a right edge of the center bed module abuts a left edge of the right wing bed module; and
    the multi-piece bed panel further includes a spacer, positioned adjacent to a forward edge of the center bed module, wherein the spacer displaces the forward edge of the center bed module relative to a cab of the bedless truck.

2. The modular truck bed assembly of claim 1, wherein the bedless truck comprises a pickup truck.

3. The modular truck bed assembly of claim 1, wherein the bedless truck comprises a bed delete truck.

4. The modular truck bed assembly of claim 1, further comprising: a bulkhead module configured to attach to one or more modules of the multi-piece bed panel, wherein the bulkhead module is substantially perpendicular to the multi-piece bed panel and positioned proximal to a forward edge of the multi-piece bed panel in proximity to a rear wall of an enclosed cab of the bedless truck.

5. The modular truck bed assembly of claim 4, wherein the bulkhead module comprises a vertically adjustable bulkhead module.

6. The modular truck bed assembly of claim 4, wherein the bulkhead module is attached to the center bed module and to the wing bed modules.

7. The modular truck bed assembly of claim 1, wherein the center bed module has an L-shaped cross section and includes a center bed panel and a center tail panel, wherein the center bed panel provides a center portion of the multi-piece bed panel and wherein the center tail panel is substantially perpendicular to the center bed panel and configured to extend downward from the center bed panel.

8. The modular truck bed assembly of claim 7, wherein the center bed panel includes a gooseneck recess suitable for a gooseneck hitch.

9. The modular truck bed assembly of claim 8, wherein the center bed module further includes an gooseneck hitch, wherein the gooseneck hitch is accessible, from above, within the gooseneck recess.

10. The modular truck bed assembly of claim 7, wherein the center bed panel is a substantially continuous and planar panel.

11. A modular truck bed assembly comprising two or more modular truck bed components configured to form a modular truck bed suitable for use as a truck bed for a bedless truck, wherein:
the two or more modular truck components include two or more modular components that combine to form a multi-piece bed panel of the modular truck bed;
the two or more modular components that combine to form the multi-piece bed panel include a center bed module configured to attach to two wing bed modules including a left wing bed module and a right wing bed module;
a left edge of the center bed module abuts a right edge of the left wing bed module and a right edge of the center bed module abuts a left edge of the right wing bed module;
the center bed module has an L-shaped cross section and includes a center bed panel and a center tail panel;
the center tail panel is substantially perpendicular to the center bed panel and configured to extend downward from the center bed panel; and
wherein the center tail panel includes a rear plate window configured to expose and illuminate a rear license plate of the bedless truck.

12. A modular truck bed assembly comprising two or more modular truck bed components configured to form a modular truck bed suitable for use as a truck bed for a bedless truck, wherein:
the two or more modular truck components include two or more modular components that combine to form a multi-piece bed panel of the modular truck bed;
the two or more modular components that combine to form the multi-piece bed panel include a center bed module configured to attach to two wing bed modules including a left wing bed module and a right wing bed module;
a left edge of the center bed module abuts a right edge of the left wing bed module and a right edge of the center bed module abuts a left edge of the right wing bed module;
the center bed module has an L-shaped cross section and includes a center bed panel and a center tail panel;
the center tail panel is substantially perpendicular to the center bed panel and configured to extend downward from the center bed panel; and
wherein the center tail panel includes a trailer hitch receiver.

13. A modular truck bed assembly comprising two or more modular truck bed components configured to form a modular truck bed suitable for use as a truck bed for a bedless truck, wherein:
the two or more modular truck components include two or more modular components that combine to form a multi-piece bed panel of the modular truck bed;
the two or more modular components that combine to form the multi-piece bed panel include a center bed module configured to attach to two wing bed modules including a left wing bed module and a right wing bed module;
a left edge of the center bed module abuts a right edge of the left wing bed module and a right edge of the center bed module abuts a left edge of the right wing bed module;
the center bed module has an L-shaped cross section and includes a center bed panel and a center tail panel;
the center tail panel is substantially perpendicular to the center bed panel and configured to extend downward from the center bed panel; and
wherein the center tail panel includes an opening configured to accommodate a trailer hitch receiver affixed to the bedless truck.

14. The modular truck bed assembly of claim 1, further comprising at least one side skirt attached to an outer edge of at least one of the wing bed modules.

15. The modular truck bed assembly of claim 14, where the at least one side skirt comprises a first side skirt attached to an outer edge of the left wing bed module and a second side skirt attached to an outer edge of the right wing bed module.

16. A modular truck bed assembly comprising two or more modular truck bed components configured to form a modular truck bed suitable for use as a truck bed for a bedless truck, wherein:
the two or more modular truck components include two or more modular components that combine to form a multi-piece bed panel of the modular truck bed;
the two or more modular components that combine to form the multi-piece bed panel include a center bed module configured to attach to two wing bed modules including a left wing bed module and a right wing bed module;
a left edge of the center bed module abuts a right edge of the left wing bed module and a right edge of the center bed module abuts a left edge of the right wing bed module; and
at least one side skirt attached to an outer edge of at least one of the wing bed modules,
wherein-the at least one side skirt includes one or more storage compartments.

17. The modular truck bed assembly of claim 1, wherein a width of the left wing bed module and a width of the right wing bed module accommodate a dual wheel configuration of the bedless truck.

18. The modular truck bed assembly of claim 1, wherein a width of the left wing bed module and a width of the right wing bed module accommodate a single wheel configuration of the bedless truck.

19. The modular truck bed assembly of claim 1, wherein the center bed module is affixed to one or more structural elements of the bedless truck and further wherein the wing bed modules are attached to the center bed module, but not affixed to structural elements of the bedless truck.

20. The modular truck bed assembly of claim 1, wherein the bedless truck comprises a cab and chassis truck.

21. The modular truck bed assembly of claim 1, wherein the center bed module includes a gooseneck feature and wherein the displacement of the center bed module attributable to the spacer is sufficient to align the gooseneck feature with a rear axle of the bedless truck.

22. The modular truck bed assembly of claim 1, further comprising an extension attached to a rearward edge of the center bed module, wherein the extension extends a length of the bed panel by an amount determined in accordance with the displacement attributable to the spacer, wherein a total length of the multi-piece bed panel, including the spacer, the center bed module, and the extension remains the same for spacers of different dimensions.

23. A motorized vehicle, comprising:
a bedless truck; and
a modular truck bed assembly comprising two or more modular truck bed components configured to form a modular truck bed suitable for use as a truck bed for the bedless truck, wherein the two or more modular truck components include two or more modular components that combine to form a multi-piece bed panel of the modular truck bed
wherein the two or more modular components that combine to form the multi-piece bed panel include a center bed module configured to attach to two wing bed modules including a left wing bed module and a right wing bed module, wherein a left edge of the center bed module abuts a right edge of the left wing bed module and a right edge of the center bed module abuts a left edge of the right wing bed module,
wherein the multi-piece bed panel further includes a spacer, positioned adjacent to a forward edge of the center bed module, wherein the spacer displaces the forward edge of the center bed module relative to a cab of the bedless truck.

24. The motorized vehicle of claim 23, further comprising at least one side skirt attached to an outer edge of at least one of the wing bed modules.

25. The motorized vehicle of claim 23, wherein the center bed module is affixed to one or more structural elements of the bedless truck and further wherein the wing bed modules are attached to the center bed module, but not affixed to structural elements of the bedless truck.

26. The motorized vehicle of claim 23, wherein the center bed module includes a gooseneck feature and wherein a displacement of the center bed module attributable to the spacer is sufficient to align the gooseneck feature with a rear axle of the bedless truck.

27. The motorized vehicle of claim 23, further comprising an extension attached to a rearward edge of the center bed module, wherein the extension extends a length of the bed panel by an amount determined in accordance with the displacement attributable to the spacer, wherein the total length of the multi-piece bed panel, including the spacer, the center bed module, and the extension, remains the same for spacers of different dimensions.

28. The motorized vehicle of claim 23, further comprising: a bulkhead module configured to attach to one or more modules of the multi-piece bed panel, wherein the bulkhead module is substantially perpendicular to the multi-piece bed panel and positioned proximal to a forward edge of the multi-piece bed panel in proximity to a rear wall of an enclosed cab of the bedless truck.

29. The motorized vehicle of claim 23, wherein the center bed module has an L-shaped cross section and includes a center bed panel and a center tail panel that is substantially perpendicular to the center bed panel, wherein the center bed panel provides a center portion of the multi-piece bed panel.

* * * * *